United States Patent
Maniwa et al.

(10) Patent No.: US 8,462,445 B2
(45) Date of Patent: Jun. 11, 2013

(54) ZOOM LENS BARREL

(75) Inventors: Junichi Maniwa, Komae (JP); Eiji Yoshino, Kawasaki (JP); Koji Sudo, Machida (JP); Yohei Fujitani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 12/852,255

(22) Filed: Aug. 6, 2010

(65) Prior Publication Data

US 2011/0043929 A1     Feb. 24, 2011

(30) Foreign Application Priority Data

Aug. 18, 2009    (JP) ................... 2009-188821

(51) Int. Cl.
*G02B 15/14*          (2006.01)

(52) U.S. Cl.
USPC ............................ 359/696; 359/697; 359/694

(58) Field of Classification Search
USPC .................. 359/676–704, 811–824, 826, 829
See application file for complete search history.

(56) References Cited

U.S. PATENT DOCUMENTS

| 5,027,147 | A | * | 6/1991 | Kaneda | ............................ | 396/81 |
| 5,249,010 | A | * | 9/1993 | Kaneda | ............................ | 396/81 |
| 6,993,256 | B2 | * | 1/2006 | Ogg et al. | ........................ | 396/81 |
| 7,852,568 | B2 | * | 12/2010 | Morimoto | ...................... | 359/697 |
| 7,986,469 | B2 | * | 7/2011 | Yumiki et al. | ................. | 359/694 |

FOREIGN PATENT DOCUMENTS

JP      H02-068507 A      3/1990

\* cited by examiner

*Primary Examiner* — Mohammed Hasan
(74) *Attorney, Agent, or Firm* — Canon USA Inc IP Division

(57) ABSTRACT

A lens control apparatus having a zoom lens includes first and second operation members that give a zoom instruction for moving the zoom lens, and a controller that changes a zoom stop position to a first pattern according to the operation of the first operation member, and changes the zoom stop position to a second pattern, which has an interval wider than that in the first pattern, according to the operation of the second operation member.

11 Claims, 11 Drawing Sheets

BACK SIDE OF IMAGING APPARATUS

FRONT SIDE OF IMAGING APPARATUS

ZOOM LENS BARREL

BACKGROUND OF THE INVENTION

1. Field of the Invention

The present invention relates to an imaging apparatus, and more particularly to a technique of enhancing operability when a focal length or an angle of view of a captured image is changed in an imaging apparatus having a zoom function.

2. Description of the Related Art

Japanese Patent Application Laid-Open No. 2-68507 discusses that conventional imaging apparatuses having a zoom lens include the one in which a zoom mode continuously changes the focal length and the other in which a zoom mode stepwisely changes a predetermined focal length, when a focal length of the zoom lens is changed.

However, when a user intends to take a photo with the specific focal length such as 28 mm, 35 mm, or 50 mm, which is generally used for a short focal lens of a camera, the problem described below arises according to the technique discussed in Japanese Patent Application Laid-Open No. 2-68507. Namely, correctly adjusting the focal length to the desired one is not easy in the zoom mode that continuously changes the focal length. Further, in the zoom mode that stepwisely changes the focal length, the user has to keep depressing a zoom operation switch or to depress the same switch a plurality of times until the user sets the focal length to the desired one. Further, when the focal length, that is stepwisely changed, does not have a desired angle of view, and a user intends to perform fine adjustment, the user has to change the mode to the zoom mode that continuously changes the focal length, and then, the user has to perform again the zoom operation.

SUMMARY OF THE INVENTION

The present invention includes the first zoom control mode and the second zoom control mode. Therefore, the zoom position can be changed designating the specific focal length and angle of view, and further, the angle of view can easily and finely be adjusted to a desired one. Accordingly, operability when changing a focal length or an angle of view of the imaging apparatus, can be enhanced.

According to an aspect of the present invention, a lens control apparatus having a zoom lens includes first and second operation members that give a zoom instruction for moving the zoom lens, and a controller that changes a zoom stop position to a first pattern according to the operation of the first operation member, and changes the zoom stop position to a second pattern, which has an interval wider than that in the first pattern, according to the operation of the second operation member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The present invention will now be described in detail below with reference to the accompanying drawings illustrating embodiments thereof.

An important point of the present invention is that the present invention includes the above first and second zoom control modes. Typically, the control mode can be changed to the first zoom control mode according to the operation of the first operation member, and the control mode can be changed to the second zoom control mode according to the operation of the second operation member. When the zooming is executed by the optical zooming in the zoom control mode, it can be determined from the viewpoint of the control position of the zoom lens that by the operation member, the zoom position can be changed in a first pattern or in a designated manner. When the zooming is executed by an electronic zooming in the zoom control mode, it can be determined from the viewpoint of the angle of view of a captured image on a display unit that by the operation member, the angle of view of the captured image can be changed according to the first pattern or in a directly designated manner.

Based on such a thought, the basic form of the imaging apparatus according to the present invention includes the above configuration. The exemplary embodiments described below are possible based on the basic form. For example, the zoom position is continuously or stepwisely arranged in the first pattern (refer to a first exemplary embodiment described below). A control unit can change the zoom speed depending on the member being operated of the first and second operation members (refer to a second exemplary embodiment described below). In this case, the control unit typically increases the zoom speed in the second zoom control mode compared with the zoom speed in the first zoom control mode. When the second operation member is operated during the electronic zooming, the control unit cancels the electronic zooming, and can change the zoom position only by the optical zooming (refer to a third exemplary embodiment described below).

An exemplary embodiment of the present invention will be described in detail with reference to the attached drawings.

Figure 1A:
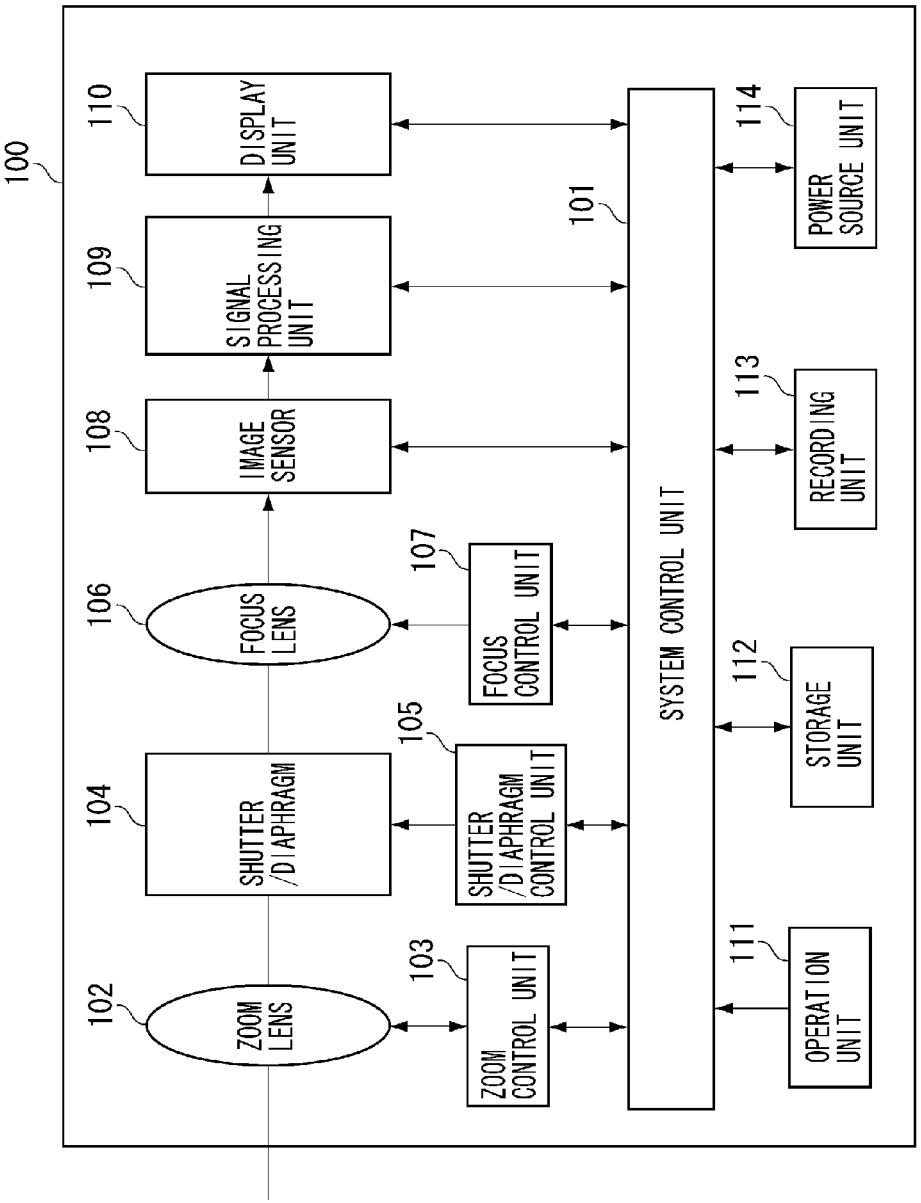
FIGS. 1A, 1B, and 1C are a block diagram illustrating a configuration of an imaging apparatus and diagrams illustrating a zoom operation member according to one exemplary embodiment of the present invention.

A configuration and operation of an imaging apparatus according to a first exemplary embodiment of the present invention will be described with reference to FIGS. 1 to 6. FIG. 1A is a block diagram illustrating the configuration of an imaging apparatus 100, which is represented by a digital camera and to which the present invention can be applied. A system control unit 101 serving as a control unit controls the whole imaging apparatus 100. A zoom lens 102 changes a focal length by changing the position thereof in an optical axis direction. A zoom control unit 103 performs control to drive the zoom lens 101. A shutter/diaphragm control unit 105 performs control to drive a shutter/diaphragm unit 104. A focus lens 106 changes its position in the optical axis direction to perform focus adjustment. A focus control unit 107 performs control to drive the focus lens 106. An image sensor 108 converts an optical image passing through respective lenses into an electric signal. A signal processing unit 109 converts the electric signal output from the image sensor 108 into a video signal, and processes the resultant signal according to a purpose.

A display unit or a notification unit 110 includes a liquid crystal display device, speakers, and the like. The display unit or the notification unit 110 displays or notifies an operation state or a message using a character, an image, voice, etc. based on the execution of a program at the system control unit 101 or a signal output from the signal processing unit 109. An operation unit 111 includes various buttons, and inputs an instruction of various operations to the system control unit 101. A storage unit 112 is a memory that stores various pieces of data such as a constant, variable, a program, or video information for operating the system control unit 101. A recording unit 113 is a non-volatile memory that can electrically erase or record photographing data. A power source unit 114 supplies power source to the whole imaging apparatus 100 according to its purpose.

Next, an operation of the imaging apparatus thus configured will be described. The operation unit 111 has a shutter release button configured such that a first switch (hereinafter referred to as SW1) and a second switch (hereinafter referred to as SW2) are successively turned on according to the depression amount. When the shutter release button is half depressed, the SW1 is turned on, while the SW2 is turned on when the shutter release button is fully depressed. When the SW1 on the operation unit 111 is turned on, the system control unit 101 drives the focus lens 106 by the focus control unit 107 carrying out an AF (autofocus) function to perform focus adjustment. Simultaneously, the system control unit 101 drives the shutter/diaphragm unit 104 by the shutter/diaphragm control unit 105 carrying out an AE function to set an exposure amount to an appropriate amount. When the SW2 is turned on, the system control unit 101 converts the electric signal, which is obtained from the image sensor 108 that is exposed to the optical image, into an image signal at the signal processing unit 109 to perform an image process, and then, stores the resultant signal in the storage unit 112. Simultaneously, the system control unit 101 records image data onto a recording medium at the recording unit 113.

Figure 1B:
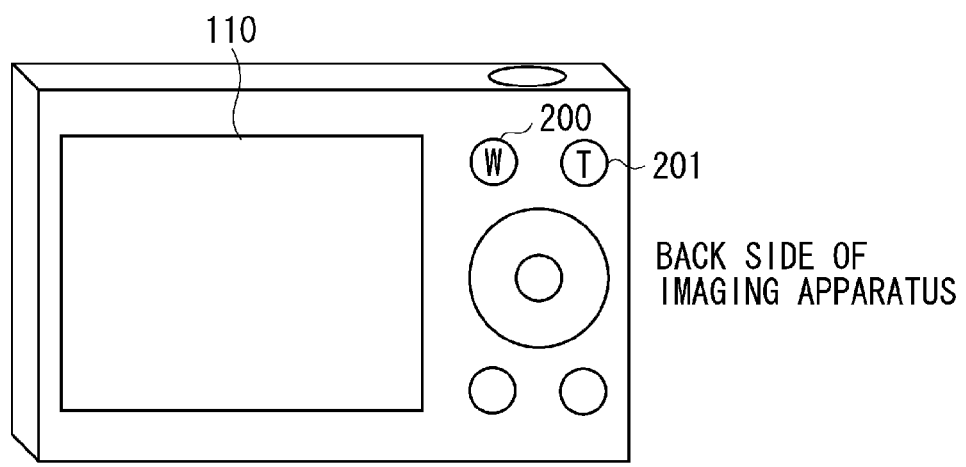
Figure 2A:
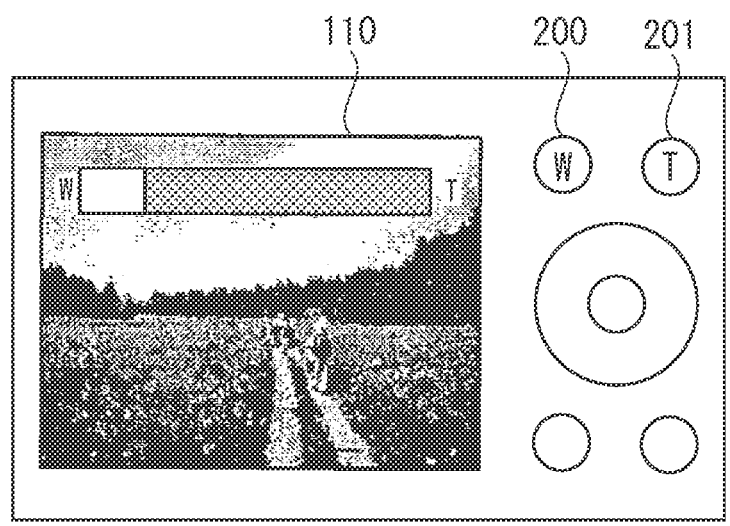
FIGS. 2A and 2B are diagrams illustrating a display screen of the imaging apparatus in performing the zoom operation according to one exemplary embodiment of the present invention.

The operation unit 111 includes a zoom wide button 200 and a zoom telephoto button 201, which are first operation members, illustrated in FIG. 1B. When the zoom button on the operation unit 111 is turned on, the system control unit 101 drives the zoom lens 102 by the zoom control unit 103 in the direction according to the zoom button that is turned on. When the zoom button is turned off, it stops the drive of the zoom lens 102. Specifically, the zoom button that is the first operation member executes a first zoom control mode through the system control unit 101, in which a zoom position is arranged (continuously or stepwisely) as a first pattern within the range between a wide-angle end and a telephoto end. In this case, the system control unit 101 displays the drive state of the zoom lens 102 as illustrated in FIG. 2A. FIG. 2A illustrates one example of a liquid crystal display (LCD) display, and shows where the zoom position is positioned between the wide-angle end and the telephoto end.

Figure 1C:
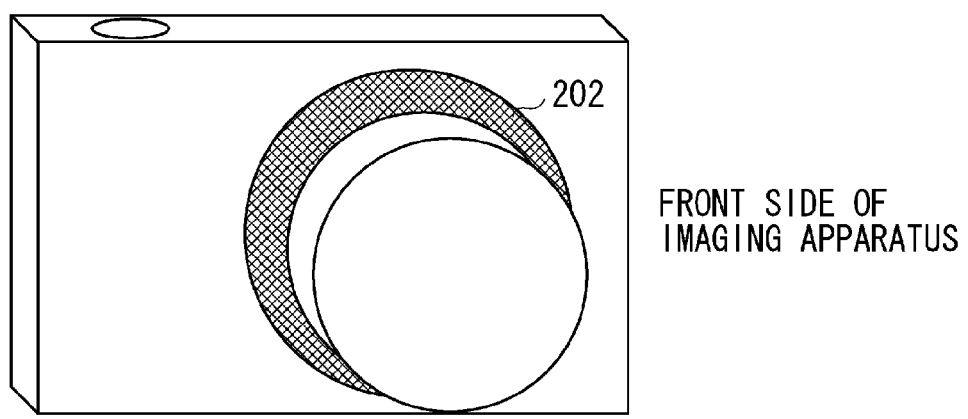
Figure 2B:
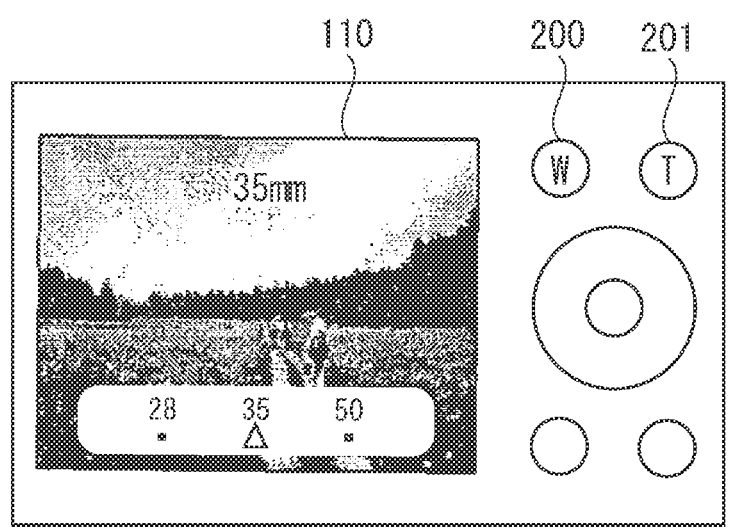

The operation unit 111 further includes a zoom ring 202 that is a second operation member illustrated in FIG. 1C. When the zoom ring 202 is turned, the system control unit 101 moves the zoom lens 102 to the focal length designated according to the turning amount of the ring by the zoom control unit 103. Specifically, the zoom ring that is the second operation member executes a second zoom control mode through the system control unit 101, in which a zoom position (here, the focal length) that can be changed and is arranged as a second pattern rougher than the first pattern, is designated. The zoom position is designated in the second zoom control mode as the pattern rougher than the pattern of the zoom position, at which the zooming can be stopped in the first zoom control mode. For example, when as the pattern in the second zoom control mode, the positions corresponding to the focal length of 28 mm, 35 mm, and 50 mm can be designated, the pattern in the first zoom control mode is as follows. Specifically, in the first zoom control mode, the pattern is set such that zooming can be stopped at one or a plurality of positions between 28 mm and 35 mm, and zooming can be stopped at one or a plurality of positions between 35 mm and 50 mm. In other words, the pattern in the first zoom control mode is denser than that in the second zoom control mode. In this case, it may be configured such that the zooming can be stopped at the position corresponding to the focal length shorter than 28 mm, or at the position corresponding to the focal length longer than 50 mm. At this time, the system control unit 101 displays the target focal length on the display unit 110 such as LCD according to the turning amount of the zoom ring 202 as illustrated in FIG. 2B. The focal length displayed on the display unit 110 is the specific focal length, such as 28 mm, 35 mm, and 50 mm, which are generally used for a short focal camera lens in the example described above.

When driving the zoom lens, the system control unit 101 drives the focus lens 106 by the focus control unit 107 based on the image information, which is sent from the image sensor 108 and processed at the signal processing unit 109, to perform the focus adjustment. The focus adjustment is performed here according to a so-called hill climbing method, for example. On the other hand, the focus adjustment when the SW1 is turned on, is performed such that scan is performed with the focus lens within a constant range to obtain an AF evaluation value, and then, the focus lens is moved to the maximum AF evaluation value.

Figure 4:
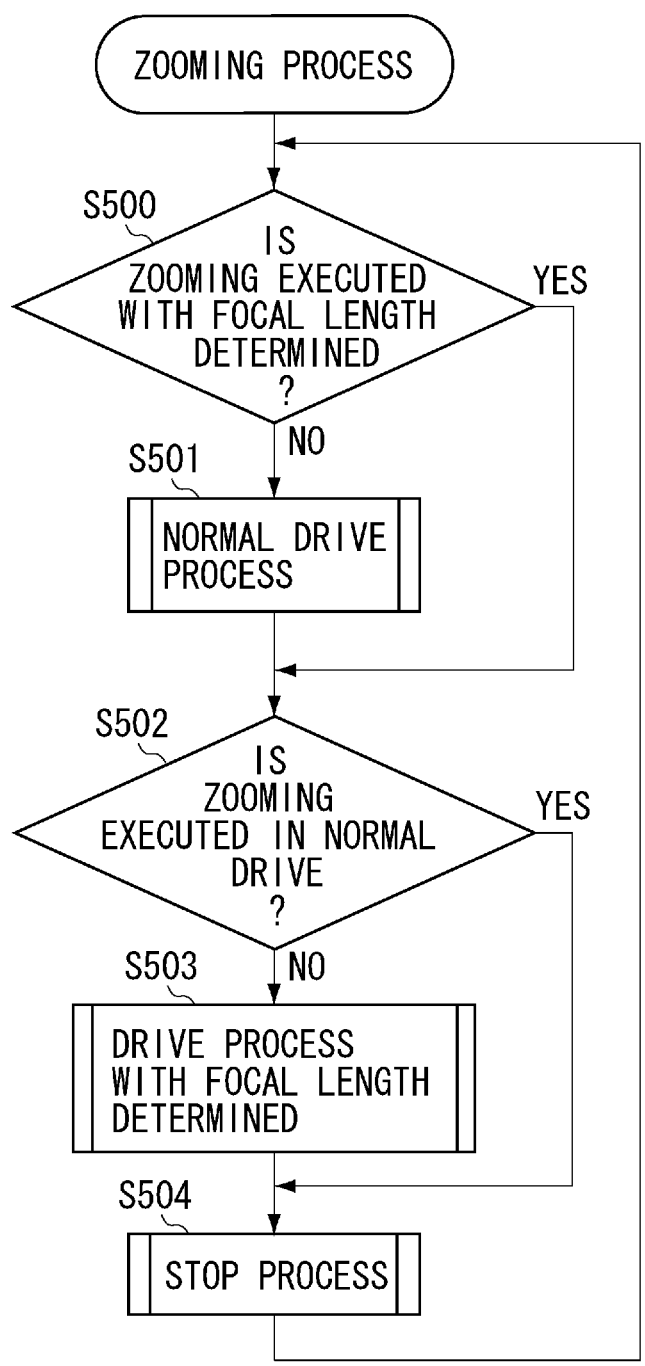
FIG. 4 is a flowchart illustrating the zoom operation of the imaging apparatus according to one exemplary embodiment of the present invention.

The zoom operation of the imaging apparatus according to the present exemplary embodiment will be described with reference to FIGS. 4 to 6. In FIG. 4, the system control unit 101 determines in step S500 whether the zooming is executed with the focal length designated (the above second zoom control mode). If the zooming is not executed with the designated focal length, the system control unit 101 executes a normal zoom drive (the above first zoom control mode) in step S501.

Figure 5A:
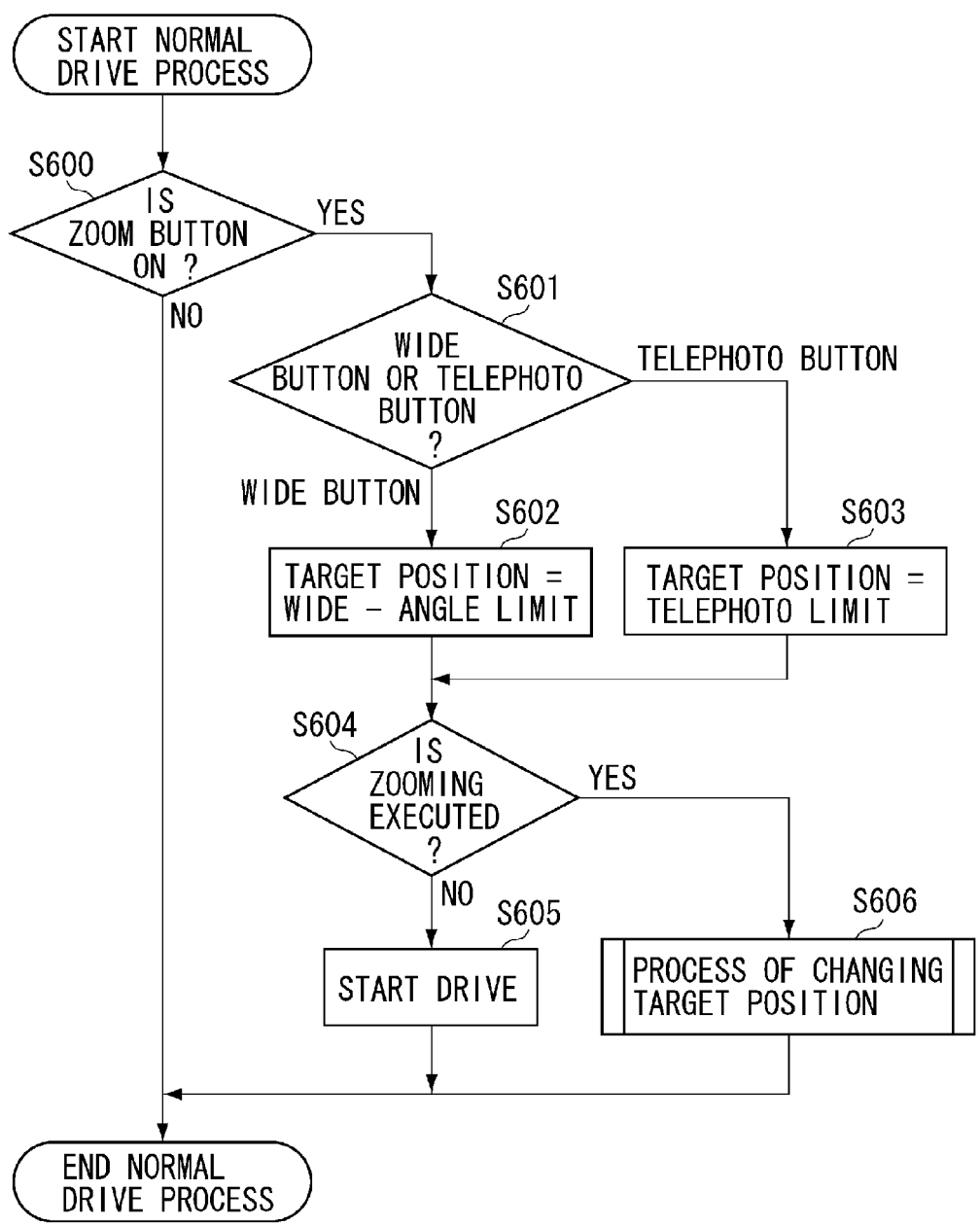
FIGS. 5A and 5B are flowcharts illustrating the zoom operation of the imaging apparatus according to one exemplary embodiment of the present invention.

The normal zoom drive process will be described with reference to FIG. 5A. In step S600, the system control unit 101 determines whether the zoom wide button 200 or the zoom telephoto button 201 is turned on. If the zoom button is not turned on (NO in step S600), the system control unit 101 ends the normal drive process. If the zoom button is turned on (YES in step S600), the system control unit 101 determines whether the zoom button turned on is the zoom wide button 200 or the zoom telephoto button 201 in step S601. When the wide button is turned on (wide button in step S601), the system control unit 101 sets a zoom target position to the wide-angle end in step S602. On the other hand, when the telephoto button is turned on (telephoto button in step S601), the system control unit 101 sets a zoom target position to be the telephoto end in step S603. The zoom target position is stored in the storage unit 112.

Next, in step S604, the system control unit 101 determines whether the zooming is executed. If the zooming is not executed (NO in step S604), the system control unit 101 starts the zooming in the direction toward the set target position in step S605, and then, ends the normal drive process. On the other hand, if the zooming is executed (YES in step S604), the system control unit 101 executes a process of changing the target position in step S606, and then, ends the normal drive process. The detail of the process of changing the target position will be described below with reference to FIG. 6B. The normal zoom drive process has been described above.

Returning to FIG. 4, when the zooming is executed with the focal length designated in step S500 or when the normal zoom drive process in step S501 is ended, the system control unit 101 determines whether the zooming is executed in the normal drive in step S502. If the zooming is not executed in the normal drive (NO in step S502), the system control unit 101 executes a zoom drive process with the focal length designated.

Figure 3A:
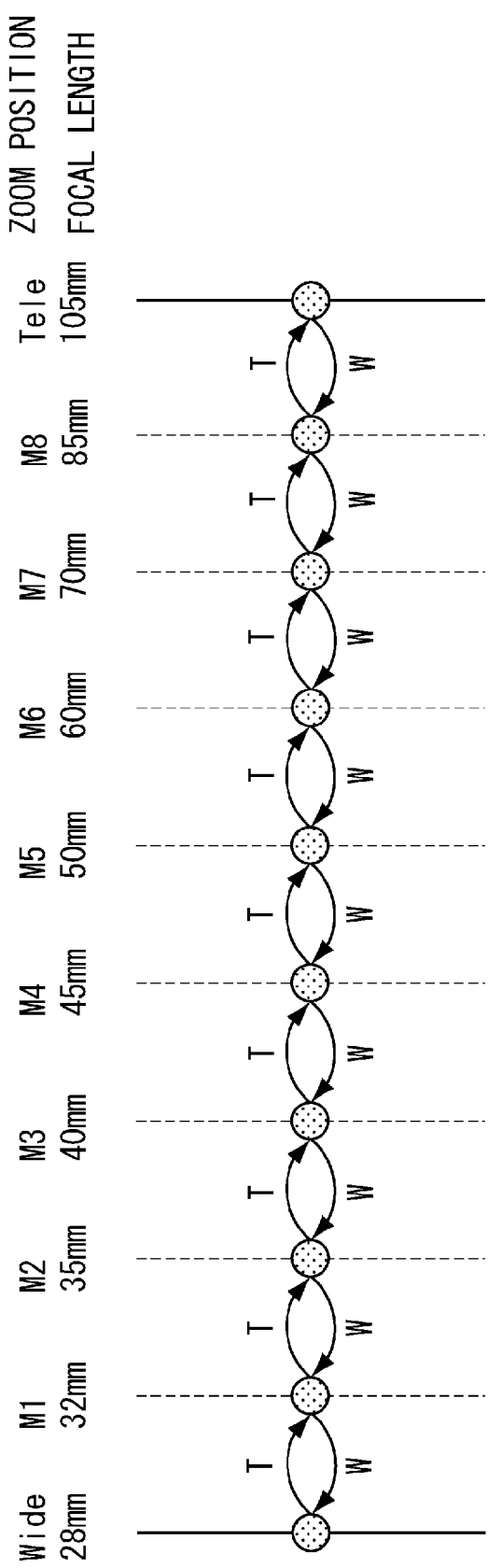
FIGS. 3A and 3B are diagrams illustrating an operation for changing the zoom position of the imaging apparatus according to one exemplary embodiment of the present invention.
Figure 3B:
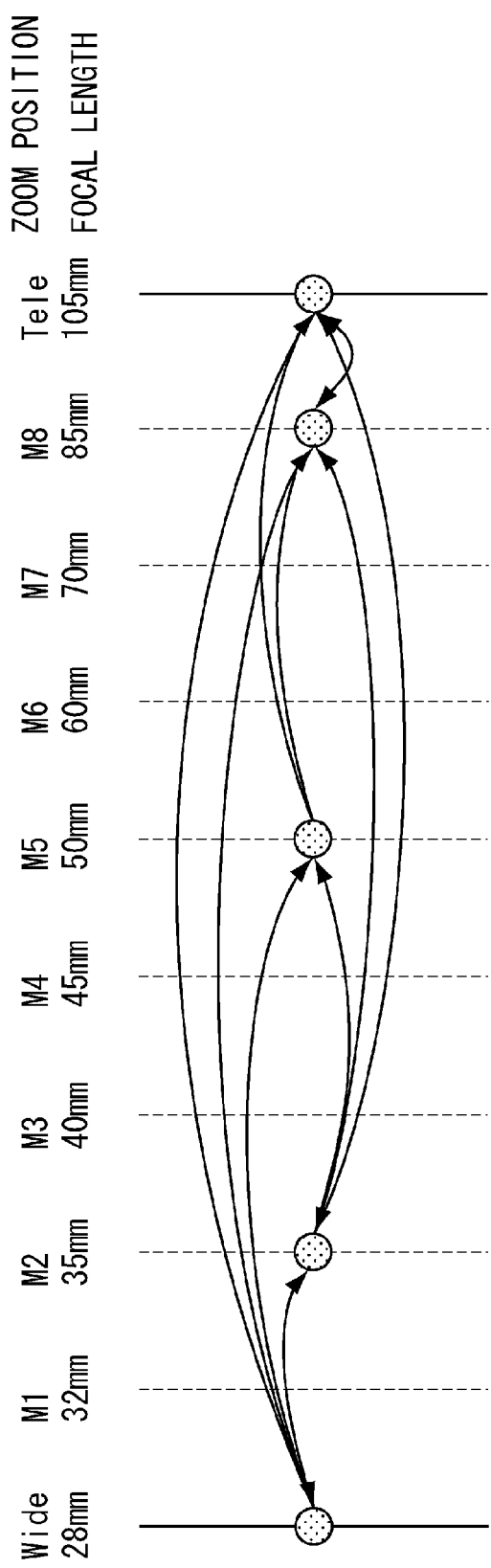
Figure 5B:
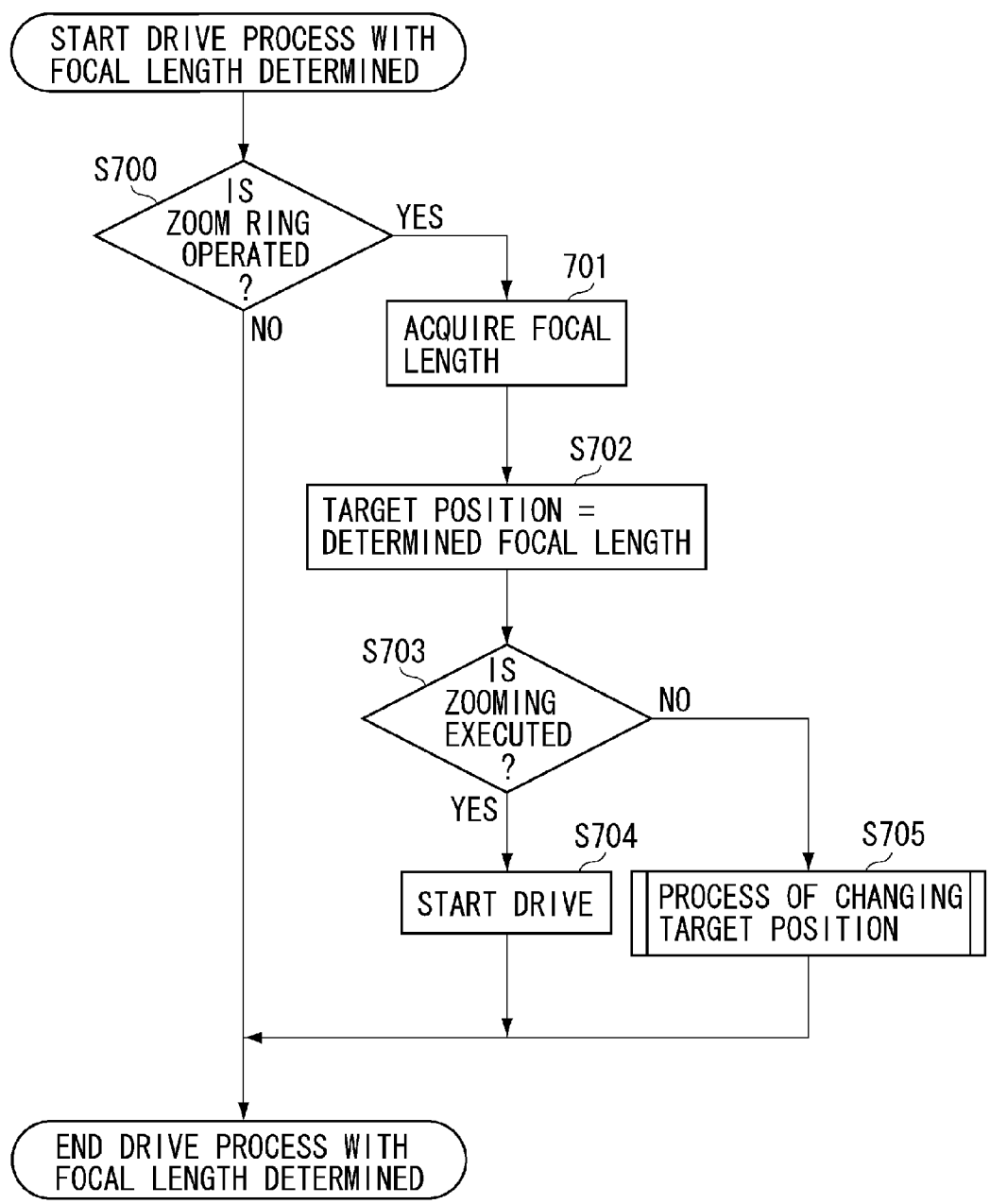

The zoom drive process with the focal length designated will be described with reference to FIG. 5B. In step S700, the system control unit 101 determines whether the zoom ring 202 is turned. If the zoom ring is not turned (NO in step S700), the system control unit 101 ends the drive process with the designated focal length. When the zoom ring is turned (YES in step S700), the system control unit 101 acquires the focal length designated according to the turning amount of the zoom ring in step S701. As illustrated in FIG. 3B, the designated focal length is the specific focal length according to the turning amount of the zoom ring 202, regardless of the current position of the zoom lens 102.

Next, in step S702, the system control unit 101 sets the zoom target position to the focal length acquired in step S701. The zoom target position is stored in the storage unit 112. Then, in step S703, the system control unit 101 determines whether the zooming is executed. If the zooming is not executed (NO in step S703), the system control unit 101 starts the zooming in the direction toward the set target position in step S704, and then, ends the drive process with the designated focal length. On the other hand, when the zooming is executed (YES in step S703), the system control unit 101 executes the process of changing the target position in step S705, and then, ends the drive process with the focal length designated. The process of changing the target position will be described below with reference to FIG. 6B. The drive process with the designated focal length has been described above.

Returning again to FIG. 4, when the zooming is executed in the normal drive in step S502 or when the drive process with the focal length designated in step S503 is ended, the system control unit 101 executes a zoom stop process in step S504, and then, the processing returns to step S500 to repeat the process.

Figure 6A:
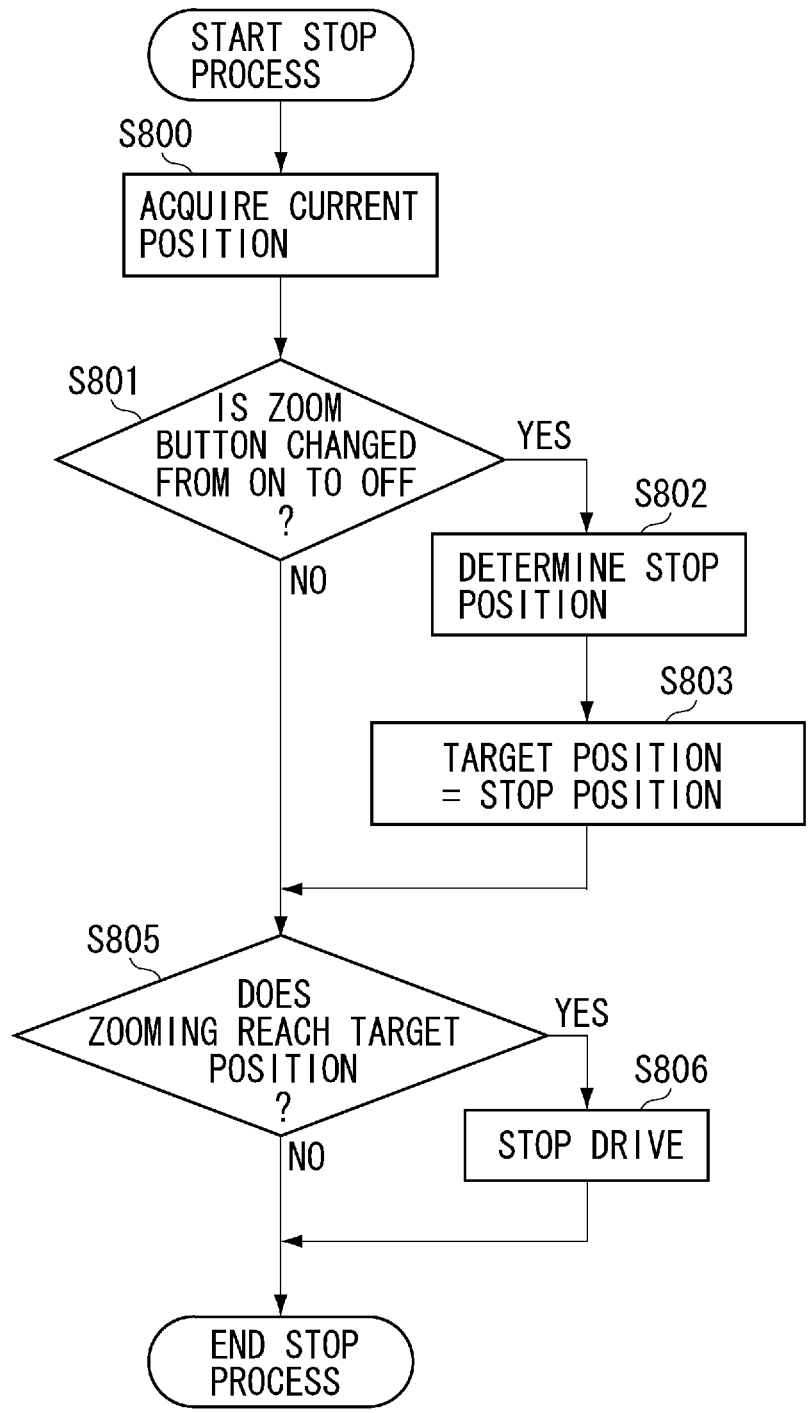
FIGS. 6A and 6B are flowcharts illustrating the zoom operation of the imaging apparatus according to one exemplary embodiment of the present invention.

The zoom stop process will be described with reference to FIG. 6A. In step S800, the system control unit 101 acquires the current zoom position. Next, in step S801, the system control unit 101 determines whether the zoom button is changed from the on-state to the off-state. When the zoom button is not changed from the on-state to the off-state (NO in step S801), the processing proceeds to step S805. When the zoom button is changed from the on-state to the off-state (YES in step S801), the system control unit 101 determines in step S802 the stop position based on the current zoom position acquired in step S800. As illustrated in FIG. 3A, the stop position is determined to be the zoom position shifted in the current drive direction from the current zoom position. Although the zoom position is stepwisely illustrated in FIG. 3A, the position where the zooming can be stopped may also be the continuous optional position.

In step S803, the system control unit 101 sets the zoom target position to be the stop position determined in step S802. The zoom target position is stored in the storage unit 112. Then, in step S805, the system control unit 101 determines whether the zooming has reached the target position stored in the storage unit 112 based on the current zoom position acquired in step S800. When the zooming has not reached the target position (NO in step S800), the system control unit 101 ends the process of stopping the zooming. On the other hand, when the zooming has reached the target position (YES in step S800), the system control unit 101 stops the drive of the zoom in step S806, and then, ends the process of stopping the zooming. The process of stopping the zooming has been described above.

Figure 6B:
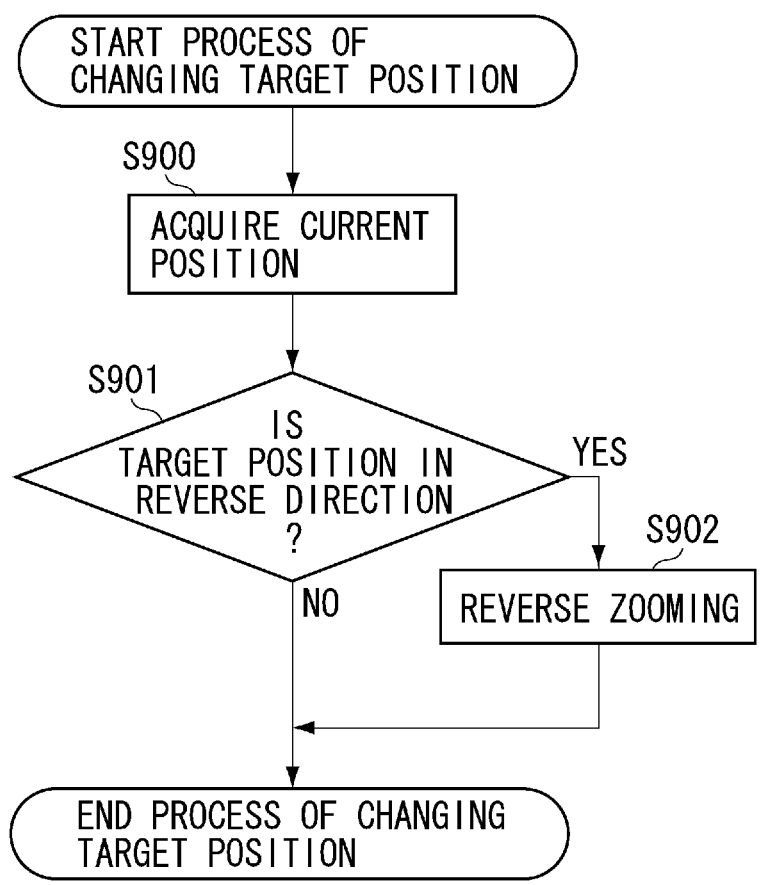

Finally, the process of changing the target zoom position will be described with reference to FIG. 6B. In step S900, the system control unit 101 acquires the current zoom position. Then, in step S901, the system control unit 101 determines whether the target position stored in the storage unit 112 is located in the reverse direction of the current drive direction relative to the current position. When the target position is not in the reverse direction (NO in step S901), the system control unit 101 ends the process of changing the target zoom position. On the other hand, when the target position is in the reverse direction (YES in step S901), the system control unit 101 reverses the zooming in step S902, and then, ends the process of changing the target zoom position. The process of changing the target zoom position has been described above.

As described above, according to the present exemplary embodiment, the specific focal length is directly designated by the zoom operation using the zoom ring, which is the second operation member, whereby the focal length of the zooming can be changed. With this, an angle of view can be adjusted to the desired one by the zoom operation using the zoom button that is the first operation member. Accordingly, the zoom operation according to a photographing scene or a subject can be comfortably carried out, whereby operability in changing the focal length of the imaging apparatus can be enhanced.

In the first exemplary embodiment, the zoom speed may be changed according to the operation member. The second exemplary embodiment is an example of executing the changeover as described above. In the second exemplary embodiment, in the case of the zooming by the zoom button (first zoom control mode), the zoom drive speed is set to be low when the zooming is started toward the target position in step S605 in FIG. 5A. In the case of the zooming by the zoom ring (second zoom control mode), the zoom drive speed is set to be high when the zooming is started toward the target position in step S704 in FIG. 5B. Thus, since the zoom speed is increased in the zoom operation by the zoom ring, the focal length can promptly be changed to the desired one. On the other hand, since the zoom speed is decreased in the zoom operation by the zoom button, fine adjustment of the angle of view can correctly be performed.

Figure 7:
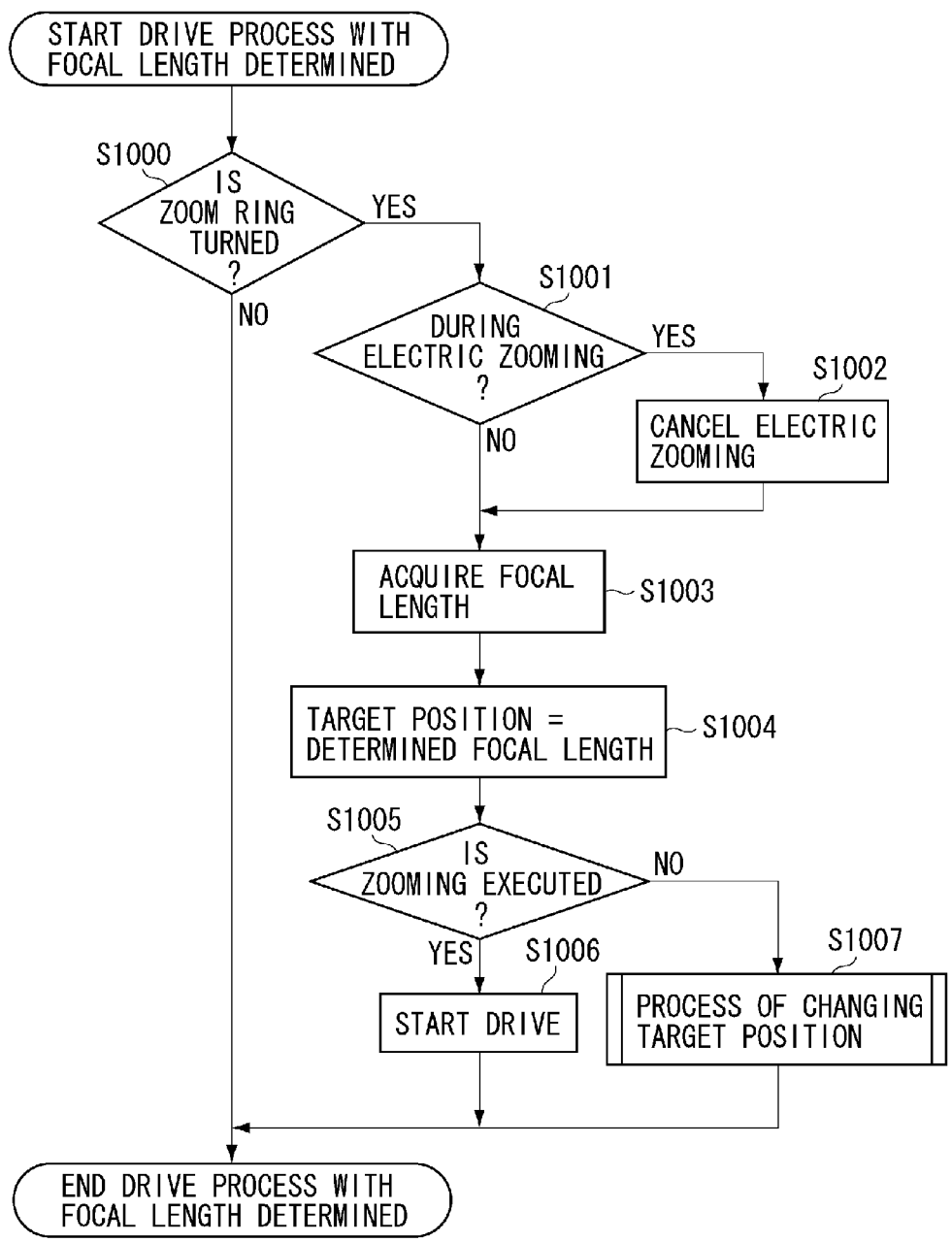
FIG. 7 is a flowchart illustrating the zoom operation of the imaging apparatus according to another exemplary embodiment of the present invention.

In the first exemplary embodiment, the electronic zooming may be canceled when the zoom ring is operated during the electronic zooming. A third exemplary embodiment illustrates this example. A zoom operation of an imaging apparatus according to the third exemplary embodiment will be described with reference to FIG. 7. Steps S1000, and S1003 to S1007 in FIG. 7 in a flowchart illustrating the zoom operation of the imaging apparatus in the present exemplary embodiment are the same as steps S700 and S701 to S705 in FIG. 5B. If the device is in the electronic zoom operation in step S1001 in FIG. 7, the system control unit 101 cancels the electronic zooming in step S1002, and the processing proceeds to step S1003.

As described above, in the present exemplary embodiment, when the zoom ring, which is the second operation member, is operated during the electronic zooming, the electronic zooming is canceled, whereby the focal length can easily be set to the desired one.

As illustrated in the third exemplary embodiment, the zoom function can be executed by the electronic zooming. As one example, the zoom lens is moved to execute an optical zooming up to a predetermined focal length, and the zoom function afterward is executed by the electronic zooming. Specifically, the zoom function can be executed by at least one of the optical zooming and the electronic zooming.

The preferable exemplary embodiments of the present invention have been described above. However, the present invention is not limited to the specific exemplary embodiments described above, and includes various modifications without departing from the scope of the invention. Some of the above exemplary embodiments may appropriately be combined. The present invention also includes the case in which a software program that realizes the function of the above exemplary embodiments is directly supplied from a recording medium, or is supplied through wired communication/wireless communication, to a system or a device, which has a computer that can execute the program, to execute the program. Therefore, a program code that can be supplied and installed in the computer to realize the functional process (the function executed by the above control unit) of the present invention realizes the present invention. Specifically, the present invention also includes the computer program that realizes the functional process of the present invention. In this case, any program form can be selected, such as an object code, a program executed by an interpreter, or script data supplied to OS, as long as it has a function of the program. Examples of usable recording medium for supplying the program include a magnetic recording medium such as a hard disk or a magnetic tape, an optical/magneto-optical recording medium, or non-volatile semiconductor memory. As the method for supplying the program, a server on a computer network may store the computer program constituting the present invention, and a client computer connected to the computer network downloads the computer program to code the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-188821 filed Aug. 18, 2009, which is hereby incorporated by reference herein in its entirety.

What is claimed is:

1. A lens control apparatus having a zoom lens comprising: first and second operation members that give a zoom instruction for moving the zoom lens; and a controller that changes a zoom stop position to a first pattern according to the operation of the first operation member, and changes the zoom stop position to a second pattern, which has an interval wider than that in the first pattern, according to the operation of the second operation member;
wherein a speed of changing the angle of view of the captured image on the display unit according to the operation member being operated of the first and the second operation member is being operated.

2. The lens control apparatus according to claim 1, wherein the controller changes a zoom speed according to the operation member being operated of the first and the second operation members.

3. The lens control apparatus according to claim 2, wherein the controller increases the zoom speed when the second operation member is operated, compared to the zoom speed when the first operation member is operated.

4. The lens control apparatus according to claim 2, wherein the controller increases the speed of changing the angle of view of the captured image on the display unit when the second operation member is operated, compared to the speed when the first operation member is operated.

5. A control apparatus for controlling an angle of view of a captured image, comprising: first and second operation members that specify an angle of view of the captured image; and a controller that changes an angle of view of the captured image on a display unit to a first pattern according to the operation of the first operation member, and changes the angle of view of the captured image on a display unit to a second pattern, which has an interval wider than that in the first pattern, according to the operation of the second operation member;
wherein the speed at which the angle of view is changed is dependent upon which the first operation member on the second operation members is being operated.

6. A lens control apparatus having a zoom lens comprising:
a first operation member that gives a zoom instruction for moving the zoom lens;
a second operation member that gives the zoom instruction; and a controller that changes a zoom stop position in response to the zoom instruction;
wherein the controller changes the zoom stop position according to a first pattern in response to the zoom instruction being given by the first operation member, within a first time period;
wherein the controller changes the zoom stop position according to a second pattern in response to the zoom instruction being given by the second operation member, within a second time period; and wherein the first time period is greater than the second time period.

7. The lens control apparatus according to claim 6, wherein the controller changes a zoom position according to the operation member being operated of the first and the second operation members.

8. The lens control apparatus according to claim 7, wherein the controller increases the zoom speed when the second operation member is operated, compared to the zoom speed when the first operation member is operated.

9. The lens control apparatus according to claim 7, wherein the controller increases the speed of changing the angle of view of the captured image on the display unit when the second operation member is operated, compared to the speed when the first operation member is operated.

10. The lens control apparatus according to claim 6, wherein the controller changes a speed of changing an angle of view of a captured image on a display unit according to the operation member being operated of the first and the second operation members.

11. The lens control apparatus according to claim 6, wherein the zoom stop position has a number of potential stop position, wherein the number of potential stop positions is different depending upon whether the first operation member or the second operation member gives the stop instruction.

* * * * *